(12) United States Patent
Sueyoshi et al.

(10) Patent No.: US 7,939,614 B2
(45) Date of Patent: May 10, 2011

(54) SILICON-CONTAINING CURING COMPOSITION AND HEAT CURED PRODUCT THEREOF

(75) Inventors: Takashi Sueyoshi, Tokyo (JP); Ken-Ichiro Hiwatari, Tokyo (JP); Tadashi Janado, Tokyo (JP); Yoshikazu Shoji, Tokyo (JP); Yoshitaka Sugawara, Osaka (JP)

(73) Assignees: Adeka Corporation, Tokyo (JP); Kansai Electric Power Company, Inc., Osaka (JP)

( * ) Notice: Subject to any disclaimer, the term of this patent is extended or adjusted under 35 U.S.C. 154(b) by 82 days.

(21) Appl. No.: 10/594,221

(22) PCT Filed: May 10, 2005

(86) PCT No.: PCT/JP2005/008490
§ 371 (c)(1), (2), (4) Date: Sep. 25, 2006

(87) PCT Pub. No.: WO2005/108496
PCT Pub. Date: Nov. 17, 2005

(65) Prior Publication Data
US 2007/0197755 A1 Aug. 23, 2007

(30) Foreign Application Priority Data
May 12, 2004 (JP) ................................. 2004-142607

(51) Int. Cl.
C08G 77/04 (2006.01)
C08G 77/12 (2006.01)
C08G 77/14 (2006.01)
C08G 77/20 (2006.01)

(52) U.S. Cl. .............. 528/15; 528/31; 528/33; 528/37

(58) Field of Classification Search .................. 528/31, 528/15, 33, 37
See application file for complete search history.

(56) References Cited

U.S. PATENT DOCUMENTS

| 3,284,406 | A | | 11/1966 | Nelson | |
|---|---|---|---|---|---|
| 4,310,678 | A | * | 1/1982 | Blizzard et al. | 556/451 |
| 5,215,801 | A | * | 6/1993 | Wong | 428/76 |
| 5,217,811 | A | * | 6/1993 | Filas et al. | 428/447 |
| 5,530,060 | A | * | 6/1996 | Fujiki et al. | 524/786 |
| 5,536,803 | A | * | 7/1996 | Fujiki et al. | 528/15 |
| 5,623,030 | A | * | 4/1997 | Tsumura et al. | 525/478 |
| 6,307,081 | B1 | | 10/2001 | Takiuchi et al. | 556/434 |
| 6,774,200 | B2 | * | 8/2004 | Kobayashi et al. | 528/31 |
| 6,777,031 | B2 | * | 8/2004 | Rocks | 427/387 |
| 2002/0111452 | A1 | * | 8/2002 | Ikeno et al. | 528/10 |
| 2002/0161140 | A1 | | 10/2002 | Yoneda et al. | |
| 2003/0181624 | A1 | * | 9/2003 | Kashiwagi et al. | 528/15 |
| 2003/0234458 | A1 | * | 12/2003 | Gardner et al. | 264/1.24 |
| 2004/0028917 | A1 | * | 2/2004 | Ikeno et al. | 428/447 |
| 2004/0116640 | A1 | * | 6/2004 | Miyoshi | 528/12 |
| 2004/0122142 | A1 | * | 6/2004 | Meguriya | 524/268 |
| 2004/0127613 | A1 | * | 7/2004 | Kashiwagi et al. | 524/261 |
| 2004/0198924 | A1 | * | 10/2004 | Young et al. | 525/474 |
| 2005/0006794 | A1 | * | 1/2005 | Kashiwagi et al. | 257/788 |
| 2005/0213926 | A1 | * | 9/2005 | Tabei et al. | 385/147 |
| 2006/0081864 | A1 | * | 4/2006 | Nakazawa | 257/98 |

FOREIGN PATENT DOCUMENTS

| CN | 1388823 | | 1/2003 |
|---|---|---|---|
| JP | 5-156166 | | 6/1993 |
| JP | 2000-231001 | | 8/2000 |
| JP | 2000-231002 | | 8/2000 |
| JP | 2002-173661 | | 6/2002 |
| JP | 2002-348473 | | 12/2002 |
| JP | 2002-356617 | | 12/2002 |
| WO | WO03080753 | * | 2/2003 |
| WO | WO 03-066707 | * | 8/2003 |

OTHER PUBLICATIONS

Machine translation of JP 2002-173661, Jun. 21, 2002.*
Gelest technical bulletin, Reactive Silicones: Forging New Polymer Links, 64 pages, 2004.*
Yoshida et al., "Development of Organic-Inorganic Hybrid Coatings by the Sold-Gel Technology," Bulletin of the Chemical Society of Japan, No. 9, 1998, pp. 571-580.
European Patent Office issued an European Office Action dated Nov. 11, 2009, Application No. 05739080.9.
JP Notice of Rejection of Dec. 28, 2010 issued in corresponding Japanese Application No. 2004-142607.

* cited by examiner

*Primary Examiner* — Randy Gulakowski
*Assistant Examiner* — Robert Loewe
(74) *Attorney, Agent, or Firm* — Young & Thompson

(57) ABSTRACT

A curable composition which comprises at least one of the following (A), (B), and (C) and further contains (D) (provided that when (C) is not contained, both (A) and (B) are in the composition. (A): A silicon-containing polymer in which the content of components having a weight-average molecular weight of 1,000 or lower is 20 wt. % or lower and which has a reactive group A' and one or more Si—O—Si bonds. (B): A silicon-containing polymer in which the content of components having a weight-average molecular weight of 1,000 or lower is 20 wt. % or lower and which has an Si—H group and one or more Si—O—Si bonds. (C): A silicon-containing polymer in which the content of components having a weight-average molecular weight of 1,000 or lower is 20 wt. % or lower and which has a reactive group A', an Si—H group, and one or more Si—O—Si bonds. (D): A catalyst for curing reaction which is a platinum catalyst. The reactive group A' is any of Si—$R^1$, Si—O—$R^2$, and Si—$R^3$—OCOC($R^4$)=$CH_2$, provided that $R^1$ and $R^2$ each is alkenyl, $R^3$ is alkylene and/or arylene, and $R^4$ is hydrogen or methyl.

6 Claims, No Drawings

SILICON-CONTAINING CURING COMPOSITION AND HEAT CURED PRODUCT THEREOF

TECHNICAL FIELD

This invention relates to a silicon containing curing composition and a heat cured product thereof. More particularly, it relates to a silicon containing curing composition excellent in storage stability, transparency, handling properties, and curing properties and capable of producing a heat resistant cured product.

BACKGROUND ART

Composites of an organic material and an inorganic material have been under various studies. Compounding an inorganic filler into an organic polymer, modifying a metal surface by coating with an organic polymer, and like techniques have been made use of on an industrial scale. The organic and inorganic materials composing such composites can admittedly bring about unexpected improvement on certain physical properties. Nevertheless, because the individual materials composing an organic-inorganic composite are of sizes of the order of micrometer or greater, improvement on many other physical properties and performance properties that can be obtained by use of the composite is nothing more than the levels predictable from the performance and physical properties of the constituent materials based on sum rule.

Recently, there has been an increase of research into organic-inorganic composites in which organic and inorganic materials are combined with their domain sizes of the order of nanometer or even on molecular level. Such composites are promising for exhibiting not only the characteristics and merits inherent to the individual materials but also new functionality that is quite different from the functions of the individual materials and therefore unpredictable by sum rule.

Such organic-inorganic composites include chemically bonded composites in which one of the constituent materials is bonded to the other on molecular level via a covalent bond and dispersed composites in which one of the materials is finely dispersed in the other (matrix). A sol gel process is widely utilized to synthesize inorganic materials for use in these organic-inorganic composites. A sol gel process is a technique for obtaining a crosslinked inorganic oxide in low temperature, in which precursor molecules are hydrolyzed followed by polycondensation. The problem of the inorganic materials prepared by the sol gel process is poor storage stability such that gelation occurs in a short time. Non-Patent Document 1 reports an attempt to improve storage stability with attention focused on dependence of the condensation reaction rate of an alkyltrialkoxysilane on the alkyl chain length. According to the report, polycondensation of methyltrimethoxysilane is followed by adding a long-chain alkyltrialkoxysilane having a low condensation reaction rate thereby to block the silanol groups of the polysiloxane. The report also teaches that methyltrimethoxysilane is polycondensed using an aluminum catalyst and, when a predetermined molecular weight is reached, acetylacetone is added to the reaction system whereby to cause a ligand exchange reaction in the system. However, these methods are still insufficient for improving the storage stability. Furthermore, inorganic materials synthesized by a sol-gel process have a disadvantage of poor flexibility.

Patent Document 1 discloses a curing composition containing a specific silicon containing polymer as a chemically bonded organic-inorganic composite. However, the curing composition containing the silicon containing polymer has insufficient performance. In particular, a cured product of the curing composition is unsatisfactory in heat resistance and handling properties.

Patent Document 1: JP-A-2002-356617
Non-Patent Document 1: The Chemical Society of Japan, Nippon Kagaku Kaishi (Bulletin of the Chemical Society of Japan), No. 9, 571 (1998)

DISCLOSURE OF THE INVENTION

An object of the present invention is to provide a silicon containing curing composition excellent in storage stability, handling properties, and curing properties, a cured product of which is excellent in heat resistance and flexibility.

The present inventors have conducted extensive studies to accomplish the above object focusing on the structure and weight average molecular weight of a silicon containing curing composition and, as a result, reached the present invention.

The present invention provides a silicon containing curing composition containing at least one silicon containing polymer selected from the following components (A), (B), and (C) and the following component (D) as a catalyst, provided that the composition contains both the components (A) and (B) when the component (C) is absent:

(A) A silicon containing polymer having at least one kind of a reactive group A' selected from the group consisting of Si—R', Si—O—R$^2$, and Si—R$^3$—OCOC(R$^4$)=CH$_2$, wherein R$^1$ and R$^2$ each represent an alkenyl group having 2 to 20 carbon atoms which may contain an alkylene group and/or an arylene group; R$^3$ represents an alkylene group having 1 to 9 carbon atoms and/or an arylene group; and R$^4$ represents hydrogen or a methyl group,
having an Si—O—Si bridge structure at least one site thereof, and containing 20% by weight or less of a component whose weight average molecular weight is 1000 or less.

(B) A silicon containing polymer having an Si—H group, having an Si—O—Si bridge structure at least one site thereof, and containing 20% by weight or less of a component whose weight average molecular weight is 1000 or less.

(C) A silicon containing polymer having at least one kind of a reactive group A' selected from the group consisting of Si—R$^1$, Si—O—R$^2$, and Si—R$^3$—OCOC(R$^4$)=CH$_2$, wherein R$^1$ and R$^2$ each represent an alkenyl group having 2 to 20 carbon atoms which may contain an alkylene group and/or an arylene group; R$^3$ represents an alkylene group having 1 to 9 carbon atoms and/or an arylene group; and R$^4$ represents hydrogen or a methyl group,
and an Si—H group, having an Si—O—Si bridge structure at least one site thereof, and containing 20% by weight or less of a component whose weight average molecular weight is 1000 or less.

(D) A platinum-based catalyst as a catalyst for curing reaction.

The present invention also provides the silicon containing curing composition wherein the total aryl group and arylene group content of the total silicon containing polymers as components (A), (B), and (C) is 0.1% to 50% by weight.

The invention also provides the silicon containing curing composition which further contains a metal oxide fine powder as component (E).

The invention also provides a cured product obtained by heat curing the silicon containing curing composition.

BEST MODE FOR CARRYING OUT THE INVENTION

The component (A) of the invention is described below. The component (A) of the invention is a silicon containing polymer having one or more kinds of a reactive group A' selected from the group consisting of Si—R', Si—O—R², and Si—R³—OCOC(R⁴)=CH₂,
wherein R¹ and R² each represent an alkenyl group having 2 to 20 carbon atoms which may contain an alkylene group and/or an arylene group; R³ represents an alkylene group having 1 to 9 carbon atoms and/or an arylene group; and R⁴ represents hydrogen or a methyl group,
and an Si—O—Si bridge structure at one or more sites thereof and containing 20% by weight or less of a component whose weight average molecular weight is 1000 or less.

R¹ in Si—R¹ as a reactive group A' is an alkenyl group. The alkenyl group may be bonded to the silicon atom either directly or via an alkylene group, an arylene group or a combination of an alkylene group and an arylene group. The alkenyl group, which may contain an alkylene group and/or an arylene group, contains 2 to 20 carbon atoms. In view of heat resistance, a preferred carbon atom number is 2 to 5. From the viewpoint of heat resistance and curing properties, R¹ is preferably a vinyl group or an allyl group.

R² in Si—O—R² as another reactive group A' is an alkenyl group. The alkenyl group may be bonded to the oxygen atom either directly or via an alkylene group, an arylene group or a combination of an alkylene group and an arylene group. The alkenyl group, which may contain an alkylene group and/or an arylene group, contains 2 to 20 carbon atoms. From the standpoint of heat resistance, a preferred carbon atom number is 2 to 5. In terms of heat resistance and curing properties, R¹ is preferably a vinyl group or an allyl group.

R³ in Si—R³—OCOC(R⁴)=CH₂ as still another reactive group A' is an alkylene group having 1 to 9 carbon atoms and/or an arylene group. A preferred carbon atom number is 1 to 5. R⁴ is hydrogen or a methyl group, preferably hydrogen.

It suffices that the component (A) has an Si—O—Si bridge structure at least one site thereof. Understandably, an Si—O—Si bond may be repeated continuously. The component (A) may have a ladder configuration, a cage configuration, a cyclic configuration, etc., depending on the bridge configuration. The ladder, cage, cyclic or like configuration may be composed of an Si—O—Si bond wholly or partially.

The component (A) is obtained by hydrolysis and condensation of an alkoxysilane and/or a chlorosilane each having a reactive group A' to form an Si—O—Si siloxane bond. The reactive group A' can be introduced by using an alkoxysilane having the reactive group A' and/or a chlorosilane having the reactive group A'. Alternatively, an alkoxysilane having no reactive group A' and/or a chlorosilane having no reactive group A' is/are hydrolyzed and condensed, and the reactive group A' is then introduced into the resulting polymer using a reactive functional group such as Si—OH or Si—Cl. The two methods may be used in combination.

Examples of the alkoxysilane and chlorosilane having a reactive group A' include diallyldimethoxysilane, allyltrimethoxysilane, allyltriethoxysilane, diallyldiethoxysilane, butenyltriethoxysilane, vinylmethyldiethoxysilane, vinylmethyldimethoxysilane, vinyltriethoxysilane, vinyltrimethoxysilane, and chlorosilanes derived from the recited alkoxysilanes by replacing some or all of the alkoxy groups with a chloro group. The alkoxysilanes or the chlorosilanes may have their alkoxy group or chloro group hydrolyzed into a silanol group. Also included are deuterides and fluorides derived from these alkoxysilanes and chlorosilanes by replacing some or all of the hydrogen atoms with deuterium and fluorine, respectively. These alkoxysilanes and chlorosilanes can be used either individually or as a combination of two or more thereof. In view of heat resistance, electrical characteristics, curing properties, mechanical characteristics, storage stability, and handling properties, particularly preferred are trimethoxyvinylsilane, dimethylmethoxyvinylsilane, and chlorosilanes derived therefrom by replacing the alkoxy group with a chloro group.

Suitable examples of the alkoxysilanes and chlorosilanes having no reactive group A' include acetoxymethyltrimethoxysilane, benzyltriethoxysilane, bis(triethoxysilyl)methane, bis(triethoxysilyl)ethane, bis(triethoxysilyl)hexane, 3-bromopropyltrimethoxysilane, butyltrimethoxysilane, chloromethyltriethoxysilane, chlorophenyltriethoxysilane, 3-chloropropyltrimethoxysilane, diethyldiethoxysilane, diethyldimethoxysilane, dimethyldiethoxysilane, dimethyldimethoxysilane, dodecyltrimethoxysilane, ethyltriethoxysilane, ethyltrimethoxysilane, butyltrimethoxysilane, methoxypropyltrimethoxysilane, methyltriethoxysilane, methyltrimethoxysilane, octyltrimethoxysilane, phenylmethyldiethoxysilane, phenylmethyldimethoxysilane, phenyltriethoxysilane, phenyltrimethoxysilane, tetraethoxysilane, tetramethoxysilane, tolyltrimethoxysilane, diphenyldimethoxysilane, diphenyldiethoxysilane, trimethylmethoxysilane, trimethylethoxysilane, triethylethoxysilane, triphenylethoxysilane, diphenyldimethoxysilane, and methylphenyldimethoxysilane. Organosilanes having an alkoxysilyl group at both ends thereof such as 1,4-bis(dimethylmethoxysilyl)benzene are also useful. Further included are chlorosilanes derived from the above recited alkoxysilanes by replacing some or all of the alkoxy groups with a chloro group. The alkoxysilanes or the chlorosilanes may have their alkoxy group or chloro group hydrolyzed into a silanol group. Also included are deuterides and fluorides derived from the recited alkoxysilanes and chlorosilanes by replacing some or all of the hydrogen atoms with deuterium and fluorine, respectively. These alkoxysilanes and chlorosilanes can be used either individually or as a combination of two or more thereof. In view of heat resistance, electrical characteristics, curing properties, mechanical characteristics, storage stability, and handling properties, particularly preferred are phenyltrimethoxysilane, methyltriethoxysilane, dimethyldiethoxysilane, diphenyldimethoxysilane, methylphenyldimethoxysilane, and chlorosilanes derived therefrom by replacing the alkoxy group with a chloro group.

The above-described alkoxysilanes and/or chlorosilanes can each be used as a mixture of two or more thereof to produce the silicon containing polymer as component (A). If desired, it is possible to incorporate an element other than silicon, e.g., boron, magnesium, aluminum, phosphorus, titanium, iron, zinc, zirconium, niobium, tin, tellurium or tantalum, into the silicon containing polymer by treating the alkoxysilane and/or chlorosilane with an alcoholate, a chloride, a complex, etc. of the metal element or by conducting hydrolysis and condensation of the alkoxysilane and/or chlorosilane together with the above recited metal compound. Where the silicon containing polymer as component (A) has a silanol group, the number of the silanol groups can be adjusted by the reaction with an alkylchlorosilane. Examples of useful alkylchlorosilanes are monochlorosilanes including trimethylchlorosilane.

The hydrolysis and condensation of the alkoxysilane or chlorosilane, which are carried out in the invention, can be effected by what we call sol gel reaction. For example, hydrolysis and condensation are performed with or without a solvent in the presence of a catalyst including an acid and a base. Examples of the solvent include, but are not limited to, water, methanol, ethanol, n-propanol, 2-propanol, n-butanol, isobutanol, acetone, methyl ethyl ketone, dioxane, and tetrahydrofuran. These solvents may be used either individually or as a mixture of two or more thereof.

The hydrolysis and condensation reactions of the alkoxysilane or chlorosilane proceed through hydrolysis of the alkoxysilane or chlorosilane with water to produce silanol groups (Si—OH) and condensation of the silanol groups with themselves or between the silanol group and the alkoxy group or between the silanol group and the chlorosilane group. To facilitate smooth progress of the hydrolysis reaction, it is preferred to add an adequate amount of water to the reaction system. Water may be added in the form of an aqueous solution of the catalyst. The hydrolysis reaction also proceeds in the presence of moisture in the air or a trace amount of water in a solvent other than water.

The catalyst such as an acid or a base that can be used in the hydrolysis and condensation reactions is not particularly limited as long as it promotes the hydrolysis and condensation. Examples of the catalyst include inorganic acids such as hydrochloric acid, phosphoric acid, and sulfuric acid; organic acids such as acetic acid, p-toluenesulfonic acid, and monoisopropyl phosphate; inorganic bases such as sodium hydroxide, potassium hydroxide, lithium hydroxide, and ammonia; amine compounds (organic bases) such as trimethylamine, triethylamine, monoethanolamine, and diethanolamine; titanium compounds such as tetraisopropyl titanate and tetrabutyl titanate; tin compounds such as dibutyltin laurate and stannous octoate; boron compounds such as trifluoroborane; aluminum compounds such as aluminum triacetylacetate; and chlorides of metals, such as iron, cobalt, manganese, and zinc, or carboxylates of such metals, e.g., naphthenates and octoates. These compounds can be used either individually or as a combination of two or more thereof.

The order of the hydrolysis reaction and the condensation reaction is not particularly limited. When two or more alkoxysilanes or chlorosilanes are hydrolyzed and condensed, they may be separately hydrolyzed to some extent before being mixed together and subjected to hydrolysis/condensation. Alternatively, the starting materials may be mixed and subjected to hydrolysis/condensation all together.

The reactive group A' of the silicon containing polymer as component (A) may be introduced from the chlorosilane and/or alkoxysilane during the sol gel reaction or separately introduced after the sol gel reaction. For example, the sol gel reaction is conducted so as to leave an Si—OH group and/or an Si—Cl group, on which a chlorosilane and/or silanol having the reactive group A' is allowed to react to introduce the reactive group A' through a covalent bond.

The silicon containing polymer as component (A) of the invention can thus be obtained by the above-described sol gel process using an alkoxysilane and/or chlorosilane having the reactive group A' and an alkoxysilane and/or chlorosilane having no reactive group A'. It can also be obtained by reacting silicon containing polymer precursors obtained in the same manner as described above with each other. The reaction of the precursors with each other may be carried out utilizing part of the reactive group A', a sol gel reaction, or the Si—OH group and/or Si—Cl group. It is understood that introduction of the reactive group A' may be preceded by the reaction of the precursors to obtain the silicon containing polymer as component (A). By using a linear polysiloxane compound as one of the precursors, a curing composition excellent in heat resistance and handling properties is obtained conveniently. The linear polysiloxane as a precursor is obtained by hydrolysis and condensation of a bifunctional alkoxysilane and/or chlorosilane. Examples of the bifunctional alkoxysilane and chlorosilane include diethyldiethoxysilane, diethyldimethoxysilane, dimethyldiethoxysilane, dimethyldimethoxysilane, phenylmethyldiethoxysilane, phenylmethyldimethoxysilane, diphenyldimethoxysilane, and diphenyldiethoxysilane. Organosilanes having an alkoxysilyl group at both ends thereof such as 1,4-bis(dimethylmethoxysilyl)benzene are also useful. Further included are chlorosilanes derived from the above recited alkoxysilanes by replacing some or all of the alkoxy groups with a chloro group. The alkoxysilanes or the chlorosilanes may have their alkoxy group or chloro group hydrolyzed into a silanol group. Also included are deuterides and fluorides derived from the recited alkoxysilanes and chlorosilanes by replacing some or all of the hydrogen atoms with deuterium and fluorine, respectively. These alkoxysilanes and chlorosilanes can be used either individually or as a combination of two or more thereof. Understandably, the bifunctional alkoxysilane and/or chlorosilane may contain a reactive group A'. Particularly preferred of them are dichlorodimethylsilane and dichlorodiphenylsilane.

The concentration of the reactive group A' in the silicon containing polymer as component (A) is preferably 0.0001 mmol/g to 100 mmol/g, still preferably 0.001 mmol/g to 10 mmol/g, from the viewpoint of curing properties and storage stability.

The average number of the reactive groups A' in the silicon containing polymer as component (A) is preferably one or greater per molecule of the silicon containing polymer and one or smaller per silicon atom.

The proportion of a component having a weight average molecular weight of 1000 or less in the silicon containing polymer as component (A) is not more than 20% by weight, preferably 10% by weight or less, still preferably 0% by weight, in terms of heat resistance.

The weight average molecular weight of the component (A) is preferably 5,000 to 1,000,000 in terms of heat resistance and handling properties.

The weight average molecular weight of the component (A) is measured by GPC and given in terms of a polystyrene equivalent molecular weight.

The amount of the component (A) in the silicon containing curing composition of the invention is selected appropriately taking into consideration the number of the reactive groups A', the number of Si—H groups in the component (B), and the like. It is preferably 1% to 99% by weight, still preferably 35% to 50% by weight, for securing curing properties.

The component (B) used in the present invention will then be described. The component (B) of the invention is a silicon containing polymer having an Si—H group, also having an Si—O—Si bridge structure at one or more sites thereof, and containing 20% by weight or less of a component whose weight average molecular weight is 1000 or less.

It suffices that the component (B) has an Si—O—Si bridge structure at least one site thereof. Understandably, an Si—O—Si bond may be repeated continuously. The component (B) may have a ladder configuration, a cage configuration, a cyclic configuration, etc., depending on the bridge structure. The ladder, cage, cyclic or like configuration may be composed of an Si—O—Si bond wholly or partially.

The component (B) is obtained by hydrolysis and condensation of an alkoxysilane and/or a chlorosilane each having a functional group Si—H to form an Si—O—Si siloxane bond. The functional group Si—H can be introduced by using an alkoxysilane having an Si—H group and/or a chlorosilane having an Si—H group. Alternatively, an alkoxysilane having no Si—H group and/or a chlorosilane having no Si—H group is/are hydrolyzed and condensed, and an Si—H group is then introduced into the resulting polymer using a reactive functional group such as Si—OH or Si—Cl. The two methods may be used in combination.

Examples of the alkoxysilane and chlorosilane having a functional group Si—H include dimethoxysilane, trimethoxysilane, triethoxysilane, diethoxysilane, phenyldimethoxysilane, methyldimethoxysilane, dimethylmethoxysilane, methylmethoxysilane, diphenylmethoxysilane, phenyldiethoxysilane, methyldiethoxysilane, dimethylethoxysilane, methylethoxysilane, diphenylethoxysilane, and chlorosilanes derived from the recited alkoxysilanes by replacing some or all of the alkoxy groups with a chloro group. The alkoxysilanes or the chlorosilanes may have their alkoxy group or chloro group hydrolyzed into a silanol group. Also included are deuterides and fluorides derived from these alkoxysilanes and chlorosilanes by replacing some or all of the hydrogen atoms with deuterium and fluorine, respectively. These alkoxysilanes and chlorosilanes can be used either individually or as a combination of two or more thereof. In view of heat resistance, electrical characteristics, curing properties, mechanical characteristics, storage stability, and handling properties, particularly preferred are methylmethoxysilane, dimethylmethoxysilane, diphenylmethoxysilane, phenylmethylmethoxysilane, and chlorosilanes derived therefrom by replacing the alkoxy group with a chloro group.

Suitable examples of the alkoxysilanes and chlorosilanes having no functional group Si—H include acetoxymethyltrimethoxysilane, benzyltriethoxysilane, bis(triethoxysilyl)methane, bis(triethoxysilyl)ethane, bis(triethoxysilyl)hexane, 3-bromopropyltrimethoxysilane, butyltrimethoxysilane, chloromethyltriethoxysilane, chlorophenyltriethoxysilane, 3-chloropropyltrimethoxysilane, diethyldiethoxysilane, diethyldimethoxysilane, dimethyldiethoxysilane, dimethyldimethoxysilane, dodecyltrimethoxysilane, ethyltriethoxysilane, ethyltrimethoxysilane, butyltrimethoxysilane, methoxypropyltrimethoxysilane, methyltriethoxysilane, methyltrimethoxysilane, octyltrimethoxysilane, phenylmethyldiethoxysilane, phenylmethyldimethoxysilane, phenyltriethoxysilane, phenyltrimethoxysilane, tetraethoxysilane, tetramethoxysilane, tolyltrimethoxysilane, diphenyldimethoxysilane, diphenyldiethoxysilane, trimethylmethoxysilane, trimethylethoxysilane, triethylethoxysilane, triphenylethoxysilane, and chlorosilanes obtained by replacing some or all of the alkoxy groups of the recited alkoxysilanes with a chloro group. The alkoxysilanes or the chlorosilanes may have their alkoxy group or chloro group hydrolyzed into a silanol group. Also included are deuterides and fluorides derived from these alkoxysilanes and chlorosilanes by replacing some or all of the hydrogen atoms with deuterium and fluorine, respectively. These alkoxysilanes and chlorosilanes can be used either individually or as a combination of two or more thereof. In view of heat resistance, electrical characteristics, curing properties, mechanical characteristics, storage stability, and handling properties, particularly preferred are phenylmethoxysilane, methyltriethoxysilane, dimethyldiethoxysilane, diphenyldimethoxysilane, methylphenyldimethoxysilane, and silane compounds derived from these alkoxysilanes by replacing the alkoxy group with a chloro group.

The alkoxysilanes and/or chlorosilanes can each be used as a mixture of two or more thereof to produce the silicon containing polymer as component (B). If desired, it is possible to incorporate an element other than silicon, e.g., boron, magnesium, aluminum, phosphorus, titanium, iron, zinc, zirconium, niobium, tin, tellurium or tantalum, into the silicon containing polymer by treating the alkoxysilane and/or chlorosilane with an alcoholate, a chloride, a complex, etc. of the metal element or by conducting hydrolysis and condensation of the alkoxysilane and/or chlorosilane together with the above recited metal compound. Where the silicon containing polymer as component (B) has a silanol group, the number of the silanol groups can be adjusted by the reaction with an alkylchlorosilane. Examples of useful alkylchlorosilanes are monochlorosilanes including trimethylchlorosilane.

The hydrolysis and condensation of the alkoxysilane or chlorosilane can be effected by the aforementioned sol gel reaction as described with respect to the component (A). The hydrolysis and condensation proceed according to the aforementioned reaction mechanism. To facilitate smooth progress of the reactions, it is preferred to add an adequate amount of water to the reaction system as stated previously. The above-described various catalysts for promoting the hydrolysis and condensation may be used. In a preferred embodiment, for example, an acid catalyst for promoting the hydrolysis and condensation is added to let the reaction proceed under an acidic condition (pH 7 or less), and a base catalyst for promoting the hydrolysis and condensation is then added to make the reaction proceed under a neutral to basic condition. Similarly to the aforementioned case, the order of the hydrolysis reaction and the condensation reaction is not limited.

The functional group Si—H of the silicon containing polymer as component (B) may be introduced from the chlorosilane and/or alkoxysilane during the sol gel reaction or separately introduced after the sol gel reaction. For example, the sol gel reaction is conducted so as to leave an Si—OH group and/or an Si—Cl group, on which a chlorosilane and/or silanol having the functional group Si—H is allowed to react to introduce the functional group through a covalent bond.

The silicon containing polymer as component (B) of the invention can thus be obtained by the above-described sol gel reaction using an alkoxysilane and/or chlorosilane having the functional group Si—H and an alkoxysilane and/or chlorosilane having no functional group Si—H. It can also be obtained by reacting silicon containing polymer precursors obtained in the same manner as described above with each other. The reaction between the precursors may be carried out utilizing part of the functional group Si—H, a sol gel reaction, or the Si—OH group and/or Si—Cl group. It is understood that introduction of the functional group Si—H may be preceded by the reaction between the precursors to obtain the silicon containing polymer as component (B). By using a linear polysiloxane compound as one of the precursors, a curing composition excellent in heat resistance and handling properties is obtained conveniently. The linear polysiloxane as a precursor is obtained by hydrolysis and condensation of a bifunctional alkoxysilane and/or chlorosilane. Examples of the bifunctional alkoxysilane and chlorosilane include diethyldiethoxysilane, diethyldimethoxysilane, dimethyldiethoxysilane, dimethyldimethoxysilane, phenylmethyldiethoxysilane, phenylmethyldimethoxysilane, diphenyldimethoxysilane, and diphenyldiethoxysilane. Organosilanes having an alkoxysilyl group at both ends thereof such as 1,4-bis(dimethylmethoxysilyl)benzene are also useful. Further included are chlorosilanes derived from the above recited alkoxysilanes by replacing some or all of the alkoxy groups with a chloro group. The alkoxysilanes or the chlorosilanes may have their alkoxy group or chloro group hydrolyzed into a silanol group. Also included are deuterides and fluorides derived from the recited alkoxysilanes and chlorosilanes by replacing some or all of the hydrogen atoms with deuterium and fluorine, respectively. These alkoxysilanes and chlorosilanes can be used either individually or as a combination of two or more thereof. Understandably, the bifunctional alkoxysilane and/or chlorosilane may contain a functional group Si—H. Particularly preferred of them are dichlorodimethylsilane and dichlorodiphenylsilane.

The concentration of the reactive group Si—H in the silicon containing polymer as component (B) is preferably 0.0001 mmol/g to 100 mmol/g, still preferably 0.001 mmol/g to 10 mmol/g, from the viewpoint of curing properties and storage stability.

The average number of the reactive group Si—H in the silicon containing polymer as component (B) is preferably one or greater per molecule of the silicon containing polymer and one or smaller per silicon atom.

The proportion of a component having a weight average molecular weight of 1000 or less in the silicon containing polymer as component (B) is not more than 20% by weight, preferably 10% by weight or less, still preferably 0% by weight, in terms of heat resistance.

It is preferred in terms of heat resistance and handling properties that the weight average molecular weight of the component (B) be in the range of 5,000 to 1,000,000.

The weight average molecular weight of the component (B) is measured by GPC and given in terms of a polystyrene equivalent molecular weight.

The amount of the component (B) in the silicon containing curing composition of the invention is selected appropriately taking into consideration the number of the Si—H groups, the number of the reactive groups A' in the component (A), and the like. For example, it is preferably 1% to 99% by weight, still preferably 35% to 50% by weight, for securing curing properties.

The component (C) of the present invention will then be described. The component (C) is a silicon containing polymer having at least one kind of a reactive group A' selected from the group consisting of Si—$R^1$, Si—O—$R^2$, and Si—$R^3$—OCOC($R^4$)=$CH_2$, wherein $R^1$ and $R^2$ each represent an alkenyl group having 2 to 20 carbon atoms which may contain an alkylene group and/or an arylene group; $R^3$ represents an alkylene group having 1 to 9 carbon atoms and/or an arylene group; and $R^4$ represents hydrogen or a methyl group, and an Si—H group, also having an Si—O—Si bridge structure at least one site thereof, and containing 20% by weight or less of a component whose weight average molecular weight is 1000 or less.

$R^1$ in Si—$R^1$ as a reactive group A' is an alkenyl group. The alkenyl group may be bonded to the silicon atom either directly or via an alkylene group, an arylene group or a combination of an alkylene group and an arylene group. The alkenyl group, which may contain an alkylene group and/or an arylene group, contains 2 to 20 carbon atoms. From the standpoint of heat resistance, a preferred carbon atom number is 2 to 5. In terms of heat resistance and curing properties, $R^1$ is preferably a vinyl group or an allyl group.

$R^2$ in Si—O—$R^2$ as another reactive group A' is an alkenyl group. The alkenyl group may be bonded to the oxygen atom either directly or via an alkylene group, an arylene group or a combination of an alkylene group and an arylene group. The alkenyl group, which may contain an alkylene group and/or an arylene group, contains 2 to 20 carbon atoms. From the standpoint of heat resistance, a preferred carbon atom number is 2 to 5. From the viewpoint of heat resistance and curing properties, $R^2$ is preferably a vinyl group or an allyl group.

$R^3$ in Si—$R^3$—OCOC($R^4$)=$CH_2$ as still another reactive group A' is an alkylene group having 1 to 9 carbon atoms and/or an arylene group. A preferred carbon atom number is 1 to 5. $R^4$ is hydrogen or a methyl group, preferably hydrogen.

It suffices that the component (C) has an Si—O—Si bridge structure at least one site thereof. Understandably, an Si—O—Si bond may be repeated continuously. The component (C) may have a ladder configuration, a cage configuration, a cyclic configuration, etc., depending on the bridge structure. The ladder, cage, cyclic or like configuration may be composed of an Si—O—Si bond wholly or partially.

The component (C) is obtained by hydrolysis and condensation of an alkoxysilane and/or a chlorosilane each having a reactive group A' and an alkoxysilane and/or a chlorosilane each having an Si—H group to form an Si—O—Si siloxane bond. As a matter of course, an alkoxysilane and/or a chlorosilane each having both a reactive group A' and an S—H group can be used either alone or in combination with the above-described starting materials. The reactive group A' and an Si—H group can be introduced by starting with an alkoxysilane and/or a chlorosilane each having the reactive group A' and/or an Si—H group. Alternatively, an alkoxysilane and/or a chlorosilane each having either one of a reactive group A' and an Si—H group or having neither a reactive group A' nor an Si—H group is/are hydrolyzed and condensed, and a reactive group A' and/or an Si—H group is/are then introduced into the resulting polymer using a reactive functional group such as Si—OH or Si—Cl. The two methods may be used in combination.

Examples of the alkoxysilane and chlorosilane having a reactive group A' include diallyldimethoxysilane, allyltrimethoxysilane, allyltriethoxysilane, diallyldiethoxysilane, butenyltriethoxysilane, vinylmethyldiethoxysilane, vinylmethyldimethoxysilane, vinyltriethoxysilane, vinyltrimethoxysilane, and chlorosilanes derived from the recited alkoxysilanes by replacing some or all of the alkoxy groups with a chloro group. The alkoxysilanes or the chlorosilanes may have their alkoxy group or chloro group hydrolyzed into a silanol group. Also included are deuterides and fluorides derived from these alkoxysilanes and chlorosilanes by replacing some or all of the hydrogen atoms with deuterium and fluorine. These alkoxysilanes and chlorosilanes can be used either individually or as a combination of two or more thereof. In terms of heat resistance, electrical characteristics, curing properties, mechanical characteristics, storage stability, and handling properties, particularly preferred are trimethoxyvinylsilane, dimethylmethoxyvinylsilane, and chlorosilanes derived therefrom by replacing the alkoxy group with a chloro group.

Examples of the alkoxysilane and chlorosilane having a functional group Si—H include dimethoxysilane, trimethoxysilane, triethoxysilane, diethoxysilane, phenyldimethoxysilane, methyldimethoxysilane, dimethylmethoxysilane, methylmethoxysilane, diphenylmethoxysilane, phenyldiethoxysilane, methyldiethoxysilane, dimethylethoxysilane, methylethoxysilane, diphenylethoxysilane, and chlorosilanes derived from the recited alkoxysilanes by replacing some or all of the alkoxy groups with a chloro group. The alkoxysilanes or the chlorosilanes may have their alkoxy group or chloro group hydrolyzed into a silanol group. Also included are deuterides and fluorides derived from these alkoxysilanes and chlorosilanes by replacing some or all of the hydrogen atoms with deuterium and fluorine, respectively. These alkoxysilanes and chlorosilanes can be used either individually or as a combination of two or more thereof. In terms of heat resistance, electrical characteristics, curing properties, mechanical characteristics, storage stability, and handling properties, particularly preferred are methylmethoxysilane, dimethylmethoxysilane, diphenylmethoxysilane, phenylmethylmethoxysilane, and chlorosilanes derived therefrom by replacing the alkoxy group with a chloro group.

Examples of the alkoxysilane and chlorosilane having both a reactive group A' and an Si—H group include dimethoxyvinylsilane, diethoxyvinylsilane, methylmethoxyvinylsilane, phenylmethoxyvinylsilane, methylethoxyvinylsilane, phenylethoxyvinylsilane, dimethoxyallylsilane, diethoxyallylsilane, methylmethoxyallylsilane, phenylmethoxyallylsilane, methylethoxyallylsilane, phenylethoxyallylsilane, and chlorosilanes derived from these alkoxysilanes by replacing some or all of the alkoxy groups with a chloro group. The alkoxysilanes or the chlorosilanes may have their alkoxy group or chloro group hydrolyzed into a silanol group. Also included are deuterides and fluorides derived from these alkoxysilanes and chlorosilanes by replacing some or all of the hydrogen atoms with deuterium and fluorine, respectively. These alkoxysilanes and chlorosilanes can be used either individually or as a combination of two or more thereof. In terms of heat resistance, electrical characteristics, curing properties, mechanical characteristics, storage stability, and handling properties, particularly preferred are methylmethoxyvinylsilane, phenylmethoxyvinylsilane, dimethoxyvinylsilane, and chlorosilanes derived therefrom by replacing the alkoxy group with a chloro group.

Suitable examples of alkoxysilanes and chlorosilanes having neither a reactive group A' nor an Si—H group include acetoxymethyltrimethoxysilane, benzyltriethoxysilane, bis(triethoxysilyl)methane, bis(triethoxysilyl)ethane, bis(triethoxysilyl)hexane, 3-bromopropyltrimethoxysilane, butyltrimethoxysilane, chloromethyltriethoxysilane, chlorophenyltriethoxysilane, 3-chloropropyltrimethoxysilane, diethyldiethoxysilane, diethyldimethoxysilane, dimethyldiethoxysilane, dimethyldimethoxysilane, dodecyltrimethoxysilane, ethyltriethoxysilane, ethyltrimethoxysilane, butyltrimethoxysilane, methoxypropyltrimethoxysilane, methyltriethoxysilane, methyltrimethoxysilane, octyltrimethoxysilane, phenylmethyldiethoxysilane, phenylmethyldimethoxysilane, phenyltriethoxysilane, phenyltrimethoxysilane, tetraethoxysilane, tetramethoxysilane, tolyltrimethoxysilane, diphenyldimethoxysilane, diphenyldiethoxysilane, trimethylmethoxysilane, trimethylethoxysilane, triethylethoxysilane, triphenylethoxysilane, diphenyldimethoxysilane, and methylphenyldimethoxysilane. Organosilanes having an alkoxysilyl group at both ends thereof such as 1,4-bis(dimethylmethoxysilyl)benzene are also useful. Further included are chlorosilanes derived from the above recited alkoxysilanes by replacing some or all of the alkoxy groups with a chloro group. The alkoxysilanes or the chlorosilanes may have their alkoxy group or chloro group hydrolyzed into a silanol group. Also included are deuterides and fluorides derived from the recited alkoxysilanes and chlorosilanes by replacing some or all of the hydrogen atoms with deuterium and fluorine, respectively. These alkoxysilanes and chlorosilanes can be used either individually or as a combination of two or more thereof. In terms of heat resistance, electrical characteristics, curing properties, mechanical characteristics, storage stability, and handling properties, particularly preferred are phenyltrimethoxysilane, methyltriethoxysilane, dimethyldiethoxysilane, diphenyldimethoxysilane, methylphenyldimethoxysilane, and chlorosilanes derived therefrom by replacing the alkoxy group with a chloro group.

The alkoxysilanes and/or chlorosilanes can each be used as a mixture of two or more thereof to produce the silicon containing polymer as component (C) as long as the resulting polymer contains both the reactive group A' and the functional group Si—H. If desired, it is possible to incorporate an element other than silicon, e.g., boron, magnesium, aluminum, phosphorus, titanium, iron, zinc, zirconium, niobium, tin, tellurium or tantalum, into the silicon containing polymer by treating the alkoxysilane and/or chlorosilane with an alcoholate, a chloride, a complex, etc. of the metal element or by conducting hydrolysis and condensation of the alkoxysilane and/or chlorosilane together with the above recited metal compound. Where the silicon containing polymer as component (C) has a silanol group, the number of the silanol groups can be adjusted by the reaction with an alkylchlorosilane. Examples of useful alkylchlorosilanes are monochlorosilanes including trimethylchlorosilane.

The hydrolysis and condensation of the alkoxysilane or chlorosilane can be effected by the aforementioned sol gel reaction as described with respect to the components (A) and (B). The hydrolysis and condensation proceed according to the aforementioned reaction mechanism. As stated, to facilitate smooth progress of the reactions, it is preferred to add an adequate amount of water to the reaction system. The above-described various catalysts for promoting the hydrolysis and condensation may be used. In a preferred embodiment, for example, an acid catalyst for promoting the hydrolysis and condensation is added to let the reaction proceed under an acidic condition (pH 7 or less), and a base catalyst for promoting the hydrolysis and condensation is then added to make the reaction proceed under a neutral to basic condition. Similarly to the aforementioned case, the order of the hydrolysis reaction and the condensation reaction is not limited.

The reactive group A' and/or functional group Si—H of the silicon containing polymer as component (C) may be introduced from the chlorosilane and/or alkoxysilane during the sol gel reaction or separately introduced after the sol gel reaction. For example, the sol gel reaction is conducted so as to leave an Si—OH group and/or an Si—Cl group, on which a chlorosilane and/or silanol having the reactive group A' and/or the functional group Si—H is allowed to react to introduce the groups through a covalent bond.

The silicon containing polymer as component (C) of the invention can thus be obtained by the above-described sol gel reaction using an alkoxysilane and/or chlorosilane having the reactive group A' and/or the functional group Si—H and an alkoxysilane and/or chlorosilane having neither the reactive group A' nor the functional group Si—H. It can also be obtained by reacting silicon containing polymer precursors prepared in the same manner as described above with each other. The reaction between the precursors may be carried out utilizing part of the reactive group A' and/or the functional group Si—H, a sol gel reaction, or the Si—OH group and/or Si—Cl group. It is understood that introduction of the reactive group A' and/or the functional group Si—H may be preceded by the reaction between the precursors to obtain the silicon containing polymer as component (C). By using a linear polysiloxane compound as one of the precursors, a curing composition excellent in heat resistance and handling properties is obtained conveniently. The linear polysiloxane as a precursor is obtained by hydrolysis and condensation of a bifunctional alkoxysilane and/or chlorosilane. Examples of the bifunctional alkoxysilane and chlorosilane include diethyldiethoxysilane, diethyldimethoxysilane, dimethyldiethoxysilane, dimethyldimethoxysilane, phenylmethyldiethoxysilane, phenylmethyldimethoxysilane, diphenyldimethoxysilane, and diphenyldiethoxysilane. Organosilanes having an alkoxysilyl group at both ends thereof such as 1,4-bis(dimethylmethoxysilyl)benzene are also useful. Further included are chlorosilanes derived from the above recited alkoxysilanes by replacing some or all of the alkoxy groups with a chloro group. The alkoxysilanes or the chlorosilanes may have their alkoxy group or chloro group hydrolyzed into a silanol group. Also included are deuterides and fluorides derived from the recited alkoxysilanes and chlorosilanes by replacing some or all of the hydrogen atoms with deuterium and fluorine, respectively. These alkoxysilanes and chlorosilanes can be used either individually or as a combination of two or more thereof. Understandably, the bifunctional alkoxysilane and/or chlorosilane may contain a reactive group A'. Particularly preferred of them are dichlorodimethylsilane and dichlorodiphenylsilane.

The concentration of the reactive group A' in the silicon containing polymer as component (C) is preferably 0.0001 mmol/g to 100 mmol/g, still preferably 0.001 mmol/g to 10 mmol/g, from the viewpoint of curing properties and storage stability. The concentration of the reactive group Si—H in the silicon containing polymer as component (C) is preferably 0.0001 mmol/g to 100 mmol/g, still preferably 0.001 mmol/g to 10 mmol/g, from the viewpoint of curing properties and storage stability.

The average number of the reactive groups A' in the silicon containing polymer as component (C) is preferably one or greater per molecule of the silicon containing polymer and one or smaller per silicon atom in terms of curing properties and storage stability. The average number of the reactive groups Si—H in the silicon containing polymer as component (C) is preferably one or greater per molecule of the silicon containing polymer and one or smaller per silicon atom.

The proportion of a component having a weight average molecular weight of 1000 or less in the silicon containing polymer as component (C) is not more than 20% by weight, preferably 10% by weight or less, still preferably 0% by weight, in terms of heat resistance.

It is preferred in terms of heat resistance and handling properties that the weight average molecular weight of the component (C) be in the range of from 5,000 to 1,000,000. The weight average molecular weight of the component (C) is measured by GPC and given in terms of a polystyrene equivalent molecular weight.

The amount of the component (C) in the silicon containing curing composition of the invention is selected appropriately taking into consideration the number of the reactive groups A' and/or Si—H groups in the component (C), the number of the reactive groups A' and/or Si—H groups in the component (A) and/or the component (B) if used in combination, and the like. Where the silicon containing curing composition contains neither the component (A) nor the component (B), the amount of the component (C) is preferably 1% to 99% by weight to secure curing properties.

The total aryl group and arylene group content of the total silicon containing polymers as components (A), (B), and (C) will be described below. The inventors have found out that the total content of the aryl group and the arylene group of the total silicon containing polymer(s) of the silicon containing composition is heavily influential on the heat resistance and handling properties of the composition. In other words, the presence of an aryl group or an arylene group results in improved heat resistance, but too high a total content of these groups results in reduction of flowability, which adversely affects the handling properties.

More specifically, the total of the silicon containing polymers selected from the components (A), (B), and (C) preferably has a total aryl group and arylene group content of 0.1% to 50% by weight, still preferably 1% to 25% by weight, even still preferably 5% to 15% by weight. The silicon containing composition having a total aryl group and arylene group content exceeding 50% by weight has reduced flowability and is therefore poor in handling properties.

Where the silicon containing composition does not contain the component (C), the components (A) to (B) ratio of the total aryl group and arylene group content (the ratio of the total aryl group and arylene group content of the component (A) to the total aryl group and arylene group content of the component (B)) is preferably 0.5 to 1.5:0.5 to 1.5, still preferably 0.8 to 1.2:0.8 to 1.2, by weight.

The aryl group and the arylene group are preferably a phenyl group and a phenylene group, respectively.

The platinum-based catalyst as a catalyst for curing reaction, i.e., component (D) will be described below.

The platinum-based catalyst as component (D) is a known catalyst containing at least one metal selected from platinum, palladium, and rhodium which promotes hydrosilylation. Examples of the platinum-based catalyst used for hydrosilylation include platinum catalysts, such as a platinum-carbonylvinylmethyl complex, a platinum-divinyltetramethyldisiloxane complex, a platinum-cyclovinylmethylsiloxane complex, and a platinum-octylaldehyde complex; and compounds containing a platinum group metal, e.g., palladium or rhodium, in place of platinum. These catalysts can be used either individually or as a combination of two or more thereof. Those containing platinum, particularly a platinum-carbonylvinylmethyl complex is preferred in terms of curing properties. What we call Wilkinson catalysts containing the above-described platinum group metal are also included in the platinum-based catalyst of the invention.

The amount of the component (D) in the silicon containing curing composition of the invention is preferably 5% by weight or less, still preferably 0.0001% to 1.0% by weight, in terms of curing properties and storage stability. The silicon containing curing composition containing more than 5% by weight of the component (D) tends to have poor stability.

The silicon containing curing composition of the present invention preferably contains metal oxide fine powder as component (E). The metal oxide fine power that can be used as component (E) includes fine powder of inorganic materials such as so-called fillers and minerals, and organic-modified products thereof. Examples are minerals, such as colloidal silica, silica filler, silica gel, mica, and montmorillonite; metal oxides, such as aluminum oxide and zinc oxide; and organic-modified products thereof. Addition of such fine metal oxide powder results in various favorable physical properties. Fine silicon dioxide powder is a particularly preferred component (E). The fine metal oxide powder preferably has a particle size of 100 μm or smaller, still preferably 50 μm or smaller, in terms of heat resistance.

The amount of the component (E) in the silicon containing curing composition of the invention is preferably 90% by weight or less, still preferably 50% by weight or less, in view of heat resistance.

The silicon containing curing composition of the invention can optionally contain a free radical scavenger. Antioxidative substances including antioxidants and stabilizers are used as a free radical scavenger. Examples of the free radical scavenger are triethylene glycol bis[3-(3-t-butyl-5-methyl-4-hydroxyphenyl)propionate], dibutylhydroxytoluene (BHT), and 2,6-di-t-butyl-p-cresol (DBPC).

The amount of the free radical scavenger in the silicon containing curing composition is preferably 0.1% to 50% by weight, still preferably 1% to 30% by weight, in view of heat resistance, electrical characteristics, curing properties, mechanical characteristics, storage stability, and handling properties.

The silicon containing curing composition of the invention, which is a mixture containing at least one of the components (A), (B), and (C) (provided that the composition contains both the components (A) and (B) when the component (C) is absent) and a platinum-based catalyst as component (D), cures on heating. The curing reaction can be performed by any method, for example, by mixing the components immediately before use or by causing a previously prepared mixture of the components to cure by, for example, heating on demand.

The heating temperature for curing is preferably 0° to 300° C., still preferably 100° to 200° C. The curing time is preferably 0.1 to 10 hours, still preferably 1 to 6 hours. The curing composition of the present invention cures under these reaction conditions to yield a cured product with superior performance in terms of heat resistance, crack resistance, and the like.

The silicon containing curing composition of the present invention exhibits good flowability at room temperature (25° C.) and is therefore convenient to handle. A cured product of the silicon containing curing composition of the invention is excellent in heat resistance and crack resistance. More specifically, a cured product having a 5% weight loss temperature of 300° C. or higher, preferably 370° C. or higher, can be obtained conveniently, and a cured product with reduced cracking can be obtained conveniently. With reference to flowability, the silicon containing curing composition preferably has a viscosity of 50 Pa·s or less, still preferably 10 Pa·s or less, at room temperature (25° C.) as measured with a corn-plate viscometer.

In the silicon containing curing composition of the invention, curing by the reaction of the reactive group A' and the Si—H group proceeds rapidly by the action the curing catalyst, i.e., the platinum-based catalyst as component (D). As a result, the resultant cured product exhibits excellent physical properties, especially heat resistance, solvent resistance, and alkali resistance. Because the silicon containing curing composition of the invention is uniform and transparent and therefore well transmits light including ultraviolet light, it can be made photocurable by addition of a photoreactive catalyst. The composition may further contain a photoreactive monomer or resin, or one or more of the components (A), (B), and (C) may have a photoreactive group. The thus silicon containing curing composition of the invention gives materials excellent in mechanical, optical and electrical characteristics including weatherability, hardness, contamination resistance, flame retardance, moisture resistance, gas barrier properties, flexibility, elongation and strength, electrical insulation, and low dielectric constant.

In addition to the aforementioned components (A) to (D) and (E), the silicon containing curing composition of the present invention can further contain other known optional components, such as various resins, fillers, and additives, as long as the effects of the invention are not impaired. One or more of the components (A), (B), and (C) may have an organic functional group of various kinds bonded thereto to impart an additional function to the composition. The silicon containing curing composition of the invention or a cured product thereof may function as a matrix in which a useful compound is dispersed to provide a high function composite material.

The various resins that can be incorporated into the composition include polyimide resins, polyether resins such as polyethylene glycol and polypropylene glycol, polyurethane resins, epoxy resins, phenol resins, polyester resins, melamine resins, polyamide resins, and polyphenylene sulfide resins.

Examples of additives that can be optionally incorporated into the composition include ultraviolet absorbers, antistatic agents, and antioxidants.

EXAMPLES

The present invention will now be illustrated in greater detail with reference to Examples, but it should be understood that the invention is not construed as being limited thereto. In Examples, all the parts and percents are given by weight.

Synthesis Example 1

To 100 parts of methyltriethoxysilane was added a 0.4% aqueous solution of phosphoric acid, and the solution was stirred at a temperature maintained at 10° to 15° C. for 3 hours. To the reaction solution was added 80 parts of ethanol, and the reaction mixture was neutralized with a sodium hydroxide aqueous solution, followed by stirring at 60° C. for 30 minutes. After the reaction, ethanol and water of the solvent were removed by evaporation while adding 900 parts of toluene to give silicon containing polymer precursor 1. As a result of GPC analysis the silicon containing polymer precursor 1 was found to have a molecular weight Mw of 5000. The molecular weight was measured under the following conditions and obtained in terms of polystyrene equivalent. GPC analysis in the following Synthesis Examples, Examples, and Comparative Examples were conducted under the same conditions.

Conditions of Molecular Weight Measurement
  Column: TSK-GEL MULTIPORE HXL M, manufactured by Tosoh Corp.; 7.8 mm×300 mm
  Developing solvent: tetrahydrofuran

Synthesis Example 2

Ninety parts of dichlorodimethylsilane and 9 parts of dichlorodiphenylsilane were mixed, and the mixture was delivered by drops into 100 parts of ion exchanged water. The reaction mixture was freed from the aqueous phase and polymerized at 250° C. for 2 hours while removing the solvent by evaporation. To the resulting reaction solution were added 20 parts of pyridine and then 20 parts of dimethyldichlorosilane, followed by stirring for 30 minutes. The reaction system was evacuated while being heated at 250° C. to remove a low molecular weight component and pyridine hydrochloride thereby to give silicon containing polymer precursor 2. As a result of GPC analysis, the silicon containing polymer precursor 2 was found to have an Mw of 50,000.

Synthesis Example 3

Ninety parts of dichlorodimethylsilane and 9 parts of dichlorodiphenylsilane were mixed, and the mixture was delivered by drops into 100 parts of ion exchanged water. The reaction mixture was freed from the aqueous phase and polymerized at 250° C. for 2 hours while removing the solvent by evaporation. To the resulting reaction solution were added 50 parts of dioxane and 5 parts of ion exchanged water, followed by stirring for 30 minutes. The precipitate thus formed was collected, and 50 parts of toluene was added to the precipitate. The solvent was removed by evaporation at 100° C. under reduced pressure to give silicon containing polymer precursor 3. As a result of GPC analysis, the silicon containing polymer precursor 3 was found to have an Mw of 50,000.

Synthesis Example 4

A hundred parts of dichlorodimethylsilane was added dropwise to 100 parts of ion exchanged water. The reaction mixture was freed from the aqueous phase and polymerized at 250° C. for 2 hours while removing the solvent by evaporation. To the resulting reaction solution were added 20 parts of pyridine and then 20 parts of dimethyldichlorosilane, followed by stirring for 30 minutes. The reaction system was evacuated while being heated at 250° C. to remove a low molecular weight component and pyridine hydrochloride to give silicon containing polymer precursor 4. As a result of GPC analysis, the silicon containing polymer precursor 4 was found to have an Mw of 60,000.

Synthesis Example 5

Five parts of the silicon containing polymer precursor 1 obtained in Synthesis Example 1, 10 parts of pyridine, and 1.5 parts of trimethylchlorosilane were stirred in a toluene solvent at room temperature for 30 minutes. To the reaction mixture was added 100 parts of the silicon containing polymer precursor 2 obtained in Synthesis Example 2, followed by stirring to conduct copolymerization for 4 hours. The reaction was ceased by addition of ion exchanged water. The reaction mixture was washed with water to remove pyridine hydrochloride, etc. to give silicon containing polymer precursor 5. As a result of GPC analysis, the silicon containing polymer precursor 5 was found to have an Mw of 92,000.

Synthesis Example 6

Fifty parts of the silicon containing polymer precursor 5 obtained in Synthesis Example 5 and 5 parts of pyridine were added to a toluene solvent, and the mixture was divided into equal halves. To one of the halves was added 5 parts of dimethylchlorosilane, while 5 parts of dimethylvinylchlorosilane was added to the other, each followed by stirring at room temperature for 30 minutes and then at 70° C. for 30 minutes and further followed by washing with ion exchanged water to remove pyridine hydrochloride to give silicon containing polymer 5B and silicon containing polymer 5A, respectively. The silicon containing polymers 5A and 5B were both found to have an Mw of 92,000 and, as a result of $H^1$-NMR and GPC analyses, to have an aryl content of 8.4 wt %. The proportion of a component with a weight average molecular weight of 1000 or less was 0% in each polymer.

Synthesis Example 7

Fifty parts of the silicon containing polymer precursor 5 obtained in Synthesis Example 5 and 5 parts of pyridine were added to a toluene solvent, and a mixture of 5 parts of dimethylchlorosilane and 5 parts of dimethylvinylchlorosilane was further added thereto. The mixture was stirred at room temperature for 30 minutes and then at 70° C. for 30 minutes, followed by washing with ion exchanged water to remove pyridine hydrochloride to give silicon containing polymer 6. The silicon containing polymer 6 was found to have an Mw of 92,000 and, as a result of $H^1$-NMR and GPC analyses, to have an aryl content of 8.4 wt %. The proportion of a component with a weight average molecular weight of 1000 or less in the polymer was 0%.

Synthesis Example 8

Fifty parts of the silicon containing polymer precursor 3 obtained in Synthesis Example 3 and 5 parts of pyridine were added to a toluene solvent. To the mixture was further added 0.5 parts of phenyltrichlorosilane, followed by stirring at room temperature for 30 minutes and then at 70° C. for 30 minutes. The resulting mixture was divided into equal halves. To one of the halves was added 2.5 parts of dimethylchlorosilane, and 2.5 parts of dimethylvinylchlorosilane was added to the other, each followed by stirring at room temperature for 30 minutes and then at 70° C. for 30 minutes and further followed by washing with ion exchanged water to remove pyridine hydrochloride to give silicon containing polymer 7B and silicon containing polymer 7A, respectively. The silicon containing polymers 7A and 7B were both found to have an Mw of 130,000 and, as a result of $H^1$-NMR and GPC analyses, to have an aryl content of 8.4 wt %. The proportion of a component with a weight average molecular weight of 1000 or less was 0%.

Synthesis Example 9

Five parts of the silicon containing polymer precursor 1 obtained in Synthesis Example 1, 10 parts of pyridine, and 1.5 parts of trimethylchlorosilane were added to a toluene solvent, followed by stirring at room temperature for 30 minutes. To the mixture was added 100 parts of the silicon containing polymer precursor 4 obtained in Synthesis Example 4, and the mixture was subjected to copolymerization for 4 hours while stirring. The reaction was ceased by addition of ion exchange water. The reaction mixture was washed with water to remove pyridine hydrochloride, etc. thereby to yield silicon containing polymer precursor 8. As a result of GPC analysis, the silicon containing polymer precursor 8 was found to have an Mw of 92,000.

Synthesis Example 10

Fifty parts of the silicon containing polymer precursor 8 obtained in Synthesis Example 9 and 5 parts of pyridine were added to a toluene solvent. The resulting mixture was divided into equal halves. To one of the halves was added 5 parts of dimethylchlorosilane, and 5 parts of dimethylvinylchlorosilane was added to the other, each followed by stirring at room temperature for 30 minutes and then at 70° C. for 30 minutes and further followed by washing with ion exchanged water to remove pyridine hydrochloride to give silicon containing polymer 8B and silicon containing polymer 8A, respectively. The silicon containing polymers 8A and 8B were both found to have an Mw of 92,000 and to contain 0% of a component with a weight average molecular weight of 1000 or less.

Synthesis Example 11

Thirty-eight parts of dichlorodimethylsilane and fifty parts of dichlorodiphenylsilane were mixed, and the mixture was delivered by drops into 100 parts of ion exchanged water. The reaction mixture was freed from the aqueous phase and polymerized at 250° C. for 2 hours while removing the solvent by evaporation. To the resulting reaction solution were added 20 parts of pyridine and then 20 parts of dimethyldichlorosilane, followed by stirring for 30 minutes. Thereafter, the reaction system was evacuated while being heated at 250° C. to remove a low molecular weight component and pyridine hydrochloride to give silicon containing polymer precursor 9. As a result of GPC analysis, the silicon containing polymer precursor 9 was found to have an Mw of 30,000.

Synthesis Example 12

Five parts of the silicon containing polymer precursor 1 obtained in Synthesis Example 1, 10 parts of pyridine, and 1.5 parts of trimethylchlorosilane were added to a toluene solvent, followed by stirring at room temperature for 30 minutes. To the mixture was added 100 parts of the silicon containing polymer precursor 9 obtained in then 20 parts of dimethyldichlorosilane, followed by stirring for 30 minutes. Thereafter, the reaction system was evacuated while being heated at 250°

C. to remove a low molecular weight component and pyridine hydrochloride to give silicon containing polymer precursor 11. As a result of GPC analysis, the silicon containing polymer precursor 11 was found to have an Mw of 30,000.

Synthesis Example 15

Five parts of the silicon containing polymer precursor 1 obtained in Synthesis Example 1, 10 parts of pyridine, and 1.5 parts of trimethylchlorosilane were stirred in a toluene solvent at room temperature for 30 minutes. To the reaction mixture was added 100 parts of the silicon containing polymer precursor 11 obtained in Synthesis Example 14, followed by stirring to conduct copolymerization for 4 hours. The reaction was ceased by addition of ion exchanged water. The reaction mixture was washed with water to remove pyridine hydrochloride, etc. to yield silicon containing polymer precursor 12. As a result of GPC analysis, the silicon containing polymer precursor 12 was found to have an Mw of 90,000.

Synthesis Example 16

Fifty parts of the silicon containing polymer precursor 12 obtained in Synthesis Example 15 and 5 parts of pyridine were added to a toluene solvent. The resulting mixture was divided into equal halves. To one of the halves was added 5 parts of dimethylchlorosilane, and 5 parts of dimethylvinylchlorosilane was added to the other, each followed by stirring at room temperature for 30 minutes and then at 70° C. for 30 minutes and further followed by washing with ion exchanged water to remove pyridine hydrochloride thereby to give silicon containing polymer 12B and silicon containing polymer 12A, respectively. The silicon containing polymers 12A and 12B were both found to have an aryl group content of 13.0 wt % as a result of $H^1$-NMR and GPC analyses and to contain 0% of a component with a weight average molecular weight of 1000 or less as a result of GPC analysis.

Example 1

To 100 parts of an equal amount mixture of the silicon containing polymer 5A and the silicon containing polymer 5B was added 0.005 parts of a platinum-carbonylvinylmethyl complex as a curing reaction catalyst to prepare silicon containing curing composition 1.

Example 2

To 100 parts of the silicon containing polymer 6 was added 0.005 parts of a platinum-carbonylvinylmethyl complex as a curing reaction catalyst to prepare silicon containing curing composition 2.

Example 3

To 100 parts of an equal amount mixture of the silicon containing polymer 7A and the silicon containing polymer 7B was added 0.005 parts of a platinum-carbonylvinylmethyl complex as a curing reaction catalyst to prepare silicon containing curing composition 3.

Example 4

To 90 parts of an equal amount mixture of the silicon containing polymer 5A and the silicon containing polymer 5B were added 10 parts of fine silicon dioxide powder and, as a curing reaction catalyst, 0.005 parts of a platinum-carbonylvinylmethyl complex to prepare silicon containing curing composition 4.

Example 5

To 80 parts of an equal amount mixture of the silicon containing polymer 5A and the silicon containing polymer 5B were added 20 parts of fine silicon dioxide powder and, as a curing reaction catalyst, 0.005 parts of a platinum-carbonylvinylmethyl complex to prepare silicon containing curing composition 5.

Example 6

To 70 parts of an equal amount mixture of the silicon containing polymer 5A and the silicon containing polymer 5B were added 30 parts of fine silicon dioxide powder and, as a curing reaction catalyst, 0.005 parts of a platinum-carbonylvinylmethyl complex to prepare silicon containing curing composition 6.

Example 7

To 90 parts of an equal amount mixture of the silicon containing polymer 5A and the silicon containing polymer 5B were added 10 parts of a low-molecular-weight component with a weight average molecular weight of 1000 or less which was obtained in Synthesis Example 4 and, as a curing reaction catalyst, 0.005 parts of a platinum-carbonylvinylmethyl complex to prepare silicon containing curing composition 7. The low-molecular-weight component with a weight average molecular weight of 1000 or less as herein referred to is a component evaporated and collected while the reaction solution was heated at 250° C. in Synthesis Example 4.

Example 8

To 80 parts of an equal amount mixture of the silicon containing polymer 5A and the silicon containing polymer 5B were added 20 parts of the low-molecular-weight component with a weight average molecular weight of 1000 or less which was obtained in Synthesis Example 4 and, as a curing reaction catalyst, 0.005 parts of a platinum-carbonylvinylmethyl complex to prepare silicon containing curing composition 8.

Example 9

To 100 parts of an equal amount mixture of the silicon containing polymer 10A and the silicon containing polymer 10B was added 0.005 parts of a platinum-carbonylvinylmethyl complex as a curing reaction catalyst to prepare silicon containing curing composition 9.

Example 10

To 100 parts of an equal amount mixture of the silicon containing polymer 12A and the silicon containing polymer 12B was added 0.005 parts of a platinum-carbonylvinylmethyl complex as a curing reaction catalyst to prepare silicon containing curing composition 10.

Example 11

To 100 parts of an equal amount mixture of the silicon containing polymer 8A and the silicon containing polymer 8B was added 0.005 parts of a platinum-carbonylvinylmethyl complex as a curing reaction catalyst to prepare silicon containing curing composition 11.

Comparative Example 1

To 70 parts of an equal amount mixture of the silicon containing polymer 5A and the silicon containing polymer 5B were added 30 parts of the low-molecular-weight component with a weight average molecular weight of 1000 or less which was obtained in Synthesis Example 4 and, as a curing reaction catalyst, 0.005 parts of a platinum-carbonylvinylmethyl complex to prepare comparative silicon containing curing composition 1.

Comparative Example 2

To 50 parts of an equal amount mixture of the silicon containing polymer 5A and the silicon containing polymer 5B were added 50 parts of the low-molecular-weight component with a weight average molecular weight of 1000 or less which was obtained in Synthesis Example 4 and, as a curing reaction catalyst, 0.005 parts of a platinum-carbonylvinylmethyl complex to prepare comparative silicon containing curing composition 2.

tions can be drawn from the results in Table 1. Comparing the cured products 1, 2, 3, 9, 10, and 11, the cured products 1, 2, 3, 9, and 10 are better, and the heat resistance increases with the aryl group content. As is understood from the results of the cured products 1, 4, 5, and 6, the heat resistance increases with the content of fine silicon dioxide powder. The amount of the silicon dioxide powder to be compounded can be selected as appropriate to the use. The cured products 7 and 8 and the comparative cured products 1 and 2 reveal the influence of the content of a component with a weight average molecular weight of 1000 or less. As long as the content does not exceed 20 parts by weight, the heat resistance is satisfactory such that the 5% weight loss temperature is 300° C. or higher.

Room temperature handling properties of the silicon containing curing compositions 1, 9, and 10 obtained in Examples 1, 9, and 10 are shown in Table 2 below. The handling properties were evaluated in terms of viscosity at 25° C. measured with a corn-plate viscometer. The results of Examples 1 and 10 were 10 Pa·s or lower at 25° C., indicating excellent handling properties, while the composition of Example 9 was slightly difficult in handling.

TABLE 1

| Composition (part) | Example | | | | | | | | | | | Comp. Example | |
|---|---|---|---|---|---|---|---|---|---|---|---|---|---|
| | 1 | 2 | 3 | 4 | 5 | 6 | 7 | 8 | 9 | 10 | 11 | 1 | 1 |
| Si-Contg. Polymer 5A (aryl content: 8.4%) | 50 | | | 45 | 40 | 35 | 45 | 40 | | | | 35 | 25 |
| Si-Contg. Polymer 5B (aryl content: 8.4%) | 50 | | | 45 | 40 | 35 | 45 | 40 | | | | 35 | 25 |
| Si-Contg. Polymer 6 (aryl content: 8.4%) | | 100 | | | | | | | | | | | |
| Si-Contg. Polymer 7A (aryl content: 8.4%) | | | 50 | | | | | | | | | | |
| Si-Contg. Polymer 7B (aryl content: 8.4%) | | | 50 | | | | | | | | | | |
| Si-Contg. Polymer 8A (aryl content: 0%) | | | | | | | | | | | 50 | | |
| Si-Contg. Polymer 8B (aryl content: 0%) | | | | | | | | | | | 50 | | |
| Si-Contg. Polymer 10A (aryl content: 44.0%) | | | | | | | | | 50 | | | | |
| Si-Contg. Polymer 10B (aryl content: 44.0%) | | | | | | | | | 50 | | | | |
| Si-Contg. Polymer 12A (aryl content: 13.0%) | | | | | | | | | | 50 | | | |
| Si-Contg. Polymer 12B (aryl content: 13.0%) | | | | | | | | | | 50 | | | |
| Low-Molecular-Weight Component (Mw = 1000 or less) | | | | | | | 10 | 20 | | | | 30 | 50 |
| Fine SiO₂ Powder | | | | 10 | 20 | 30 | | | | | | | |
| Platinum Catalyst | 0.005 | 0.005 | 0.005 | 0.005 | 0.005 | 0.005 | 0.005 | 0.005 | 0.005 | 0.005 | 0.005 | 0.005 | 0.005 |
| Heat Resistance (5% weight loss temperature) (° C.) | 375 | 375 | 375 | 383 | 392 | 398 | 325 | 305 | 384 | 379 | 341 | 275 | 235 |

Evaluation of Physical Properties:

The silicon containing curing compositions 1 to 11 obtained in Examples 1 to 11 and the comparative silicon containing curing compositions 1 to 2 obtained in Comparative Examples 1 and 2 were each cured at 250° C. for 3 hours. The resulting cured products, designated cured products 1 to 11 and comparative cured products 1 and 2, respectively, were evaluated for heat resistance.

Evaluation was made by measuring the temperature at which the cured product lost its weight by 5%. The results obtained are shown in Table 1 below. The following observa-

TABLE 2

| | Example | | |
|---|---|---|---|
| | 1 | 10 | 9 |
| Aryl Group Content (wt %) | 8.4 | 13.0 | 44.0 |
| Handling Properties (Viscosity at 25° C.) (Pa·s) | 2 | 4 | 50 |

INDUSTRIAL APPLICABILITY

The present invention provides a silicon containing curing composition excellent in storage stability, transparency, handling properties, and curing properties and a cured product excellent in heat resistance and flexibility.

The silicon containing curing composition according to the present invention is excellent in storage stability, transparency, handling properties, curing properties, and the like and is useful as a curing composition providing a cured product with various excellent physical properties including cracking resistance, heat resistance, solvent resistance, alkali resistance, weatherability, optical characteristics, and electrical characteristics. The curing composition of the invention is applicable to the electrical and electronic field as a sealing compound for display materials, optical materials, recording materials, semiconductors, etc., a high voltage insulating compound, a potting/sealing compound for insulation, vibration absorption, waterproofing or moistureproofing, a prototype mold material for plastic parts, a coating material, an interlayer insulator, insulating packing, a heat shrinkable rubber tube, an O-ring, a sealant or protector for display devices, an optical waveguide, an optical fiber protector, an optical lens, an adhesive for optical devices, a high heat resistant adhesive, a high heat dissipative material, a high heat resistant sealant, a solar cell or fuel cell member, a solid electrolyte for batteries, an insulating coating material, a photosensitive drum for copiers, and a gas separation membrane. It is also applicable to the civil engineering and construction field as a concrete protector, a lining, a soil conditioner, a sealing compound, a cool or heat storage medium, a glass coating material, etc., and to the medical material field as a tube, a sealant, a coating compound, a sealing compound for sterilizers, contact lenses, an oxygen enrichment membrane, and so forth.

The invention claimed is:

1. A silicon containing curing composition comprising:
    at least one silicon containing polymer selected from the group consisting of: component (A) and component (B); and
    component (D) a catalyst,
    wherein,
    said composition is applicable to the electrical and electronic field as a sealing compound;
    component (A) is a silicon containing polymer, which comprises:
    at least one kind of a reactive group A' selected from the group consisting of $Si-R^1$, $Si-O-R^2$, and $Si-R^3-OCOC(R^4)=CH_2$, wherein $R^1$ and $R^2$ each represent an alkenyl group having 2 to 20 carbon atoms which may contain an alkylene group and/or an arylene group, $R^3$ represents an alkylene group having 1 to 9 carbon atoms and/or an arylene group, and $R^4$ represents hydrogen or a methyl group,
    an $Si-O-Si$ bridge structure formed from at least one site thereof, and
    20% by weight or less of a component whose weight average molecular weight is 1000 or less;
    component (A) is obtained by reacting silicon containing polymer precursors with each other, one of said silicon containing polymer precursors is a linear polysiloxane compound, and said silicon containing polymer precursors are obtained by a sol gel process using:
    an alkoxysilane and/or chlorosilane having a reactive group A', and/or
    an alkoxysilane and/or chlorosilane having no reactive group A';
    component (B) is a silicon containing polymer, which comprises:
    an $Si-H$ group,
    an $Si-O-Si$ bridge structure formed from at least one site thereof, and containing 20% by weight or less of a component whose weight average molecular weight is 1000 or less,
    provided that said $Si-H$ group is introduced into the polymer, which is formed by hydrolyzing and condensing an alkoxysilane and/or a chlorosilane, each having no $Si-H$ group, using a reactive functional group $Si-OH$ and/or a reactive functional group $Si-Cl$;
    component (D) is a platinum-based catalyst;
    the total aryl group and arylene group content of the total silicon containing polymers as components (A) and (B) is 1% to 25% by weight; and
    the components (A) and (B) each have a weight average molecular weight of 5,000 to 1,000,000.

2. The silicon containing curing composition according to claim 1, further comprising a fine metal oxide powder as component (E).

3. A cured product obtained by heat curing the silicon containing curing composition according to claim 1.

4. The silicon containing curing composition according to claim 1, wherein the bridge structure is a configuration selected from the group consisting of a ladder configuration, a cage configuration and a cyclic configuration.

5. The silicon containing curing composition according to claim 1, wherein the composition has a viscosity of 2 to 50 Pa·s at 25° C.

6. The silicon containing curing composition according to claim 1, wherein the ratio of the total aryl group and arylene group content of the component (A) to the total aryl group and arylene group content of the component (B) is 0.5 to 1.5:0.5 to 1.5 by weight.

* * * * *